United States Patent [19]
Harvey

[11] 3,776,379
[45] Dec. 4, 1973

[54] LUMBER SORTER
[76] Inventor: Edward M. Harvey, 268 Ledgerwood Dr., Hot Springs, Ark. 71901
[22] Filed: Sept. 15, 1972
[21] Appl. No.: 289,676

[52] U.S. Cl. ................................. 209/73, 209/74
[51] Int. Cl. ................................................ B07c
[58] Field of Search ............... 209/72, 73, 74, 125; 214/6 H, 6 D, 6 DK

[56] References Cited
UNITED STATES PATENTS

| | | | |
|---|---|---|---|
| 3,604,563 | 9/1971 | Ronan, Jr. | 209/74 |
| 3,606,011 | 9/1971 | Jeddeloh | 209/74 |
| 3,631,976 | 1/1972 | Coffeit | 209/74 |
| 3,529,732 | 9/1970 | Wayne | 214/6 DK |

*Primary Examiner*—Allen N. Knowles
*Attorney*—John R. Walker, III

[57] ABSTRACT

A lumber sorter including forward and rearward nylon straps suspended transversely across each of the bays to establish cooperating forward and rearward cradles for catching and supporting the lumber pieces as they are caused to fall from the disengagement mechanism of the sorter. The straps are trained about rotatable spool structure which preferably is driven by an electric motor for selectively varying the height of the cradles, i. e., each of the lumber pieces is received relatively close to the disengagement mechanism of the lumber sorter whether it be the first piece to fall on the cradles or the last. Subsequent to a bay receiving a package of lumber pieces, the straps are slackened by operating the motor, thus lowering the package until it restingly engages support structure which facilitates freeing the cradles by slipping them beyond the respective ends of the package. The support structure may be the usual buggy which heretofore received the lumber as it fell from the sorter. More preferably, the support structure is an infeed conveyor which conveys the package of lumber directly to a remote location, e. g., a stacker.

10 Claims, 5 Drawing Figures

LUMBER SORTER

BACKGROUND OF THE INVENTION

1. Field of the Invention

This invention pertains to the field of lumber sorters.

2. Description of the Prior Art

The usual practice in lumber sorting apparatus is to have a buggy positioned within each bay for catching and temporarily storing a limited quantity of the lumber pieces as they fell from the disengagement mechanism of the sorter. The buggy was loaded from the bottom progressively upwardly. Therefore, the pieces of lumber falling to an empty buggy fell a greater distance than did those pieces falling on a substantially loaded buggy. Accordingly, many of the lumber pieces get broken during the sorting process. For example, a typical lumber breakage from this cause is 2-½ percent. Obviously, the necessary downgrading of the broken lumber is costly.

This problem was previously recognized by the applicant in his U.S. Pat. No. 3,578,182. The '182 patent pertains to a lumber cart having cradle with variable height which solves the abovementioned lumber breakage problem. However, other problems which existed with prior carts or buggies still prevail when practicing the '182 patent. The disadvantages or problems alluded to are: First, the buggies or carts are supported by wheels which runningly ride upon rails. The initial installation of these rails and buggies is quite costly. Second, moving the buggies from the sorter to the next processing station is unwieldy and time-consuming, resulting in increased labor costs.

The applicant has knowledge of a brochure showing a lumber sorter which incorporates adjustable forward and rearward let down cable assemblies for each bay that catches lumber pieces at variable heights, but applicant has no knowledge as to whether or not this lumber sorter has been reduced to practice. More specifically, the forward cable assembly includes a primary and secondary cable, i. e., the primary cables are not continuous with the secondary cables or there are four cables in all for each bay. Left and right drum assemblies are also included for convolutely receiving the cable assemblies. Each of the left and right drum assemblies include forward and rearward drum elements which rotate in unison by being ganged to a common shaft. The outer ends of the primary cables are attached to the respective drum elements of the right drum assembly and the inner ends are attached to an elongated bar which is longer than any of the lumber pieces. The outer ends of the secondary cables are attached to the respective drum elements of the left drum assembly and the inner ends are also attached to the elongated bar. However, the secondary cables are attached adjacent the opposite ends of the bar and the primary cables are much closer together. The lumber pieces are supported by resting upon the close together primary cables and are unloaded therefrom by paying out the left drum assembly and/or taking in the right drum assembly which is effective to spill the lumber pieces over the bar or between the secondary cables.

SUMMARY OF THE INVENTION

The present invention is directed towards providing improvements in lumber sorters which overcome the heretofore-mentioned and other disadvantages associated with prior lumber sorters. The principal concept of the present invention is to provide an adjustable cradle means which enables the lumber pieces to be received relatively close to the disengagement mechanism of the lumber sorter whether it be the first piece to fall therefrom or the last.

Another important feature of the present invention is that it provides means for eliminating the unwieldy and costly buggies.

The lumber sorter of the present invention includes forward and rearward elongated flexible members, such as nylon straps, suspended transversely across each of the bays to establish cooperating forward and rearward cradles for catching and supporting the lumber pieces as they are caused to fall from the disengagement mechanism of the sorter. The flexible members or straps are trained about rotatable spool structure which preferably is driven by an electric motor at random intervals for selectively varying the height of the cradles, i.e., each lumber piece is received relatively close to the disengagement mechanism of the lumber sorter, whether it be the first piece to fall on the cradles or the last. Subsequent to a bay receiving a package of lumber pieces, i. e., a predetermined quantity of lumber pieces, the straps are slackened by operating the motor, thus lowering the package until it restingly engages certain support structure which facilitates freeing the cradles by slipping them beyond the respective ends of the package. It should be pointed out that the support structure may be the usual buggy which heretofore received the lumber as it fell from the sorter. However, the support structure more preferably is an infeed conveyor which has the added advantages of conveying the package of lumber direct to a stacker or the like, thus obviating the need for the unwieldy buggies and the increased labor costs associated therewith.

DESCRIPTION OF THE PREFERRED EMBODIMENT

Figure 1:
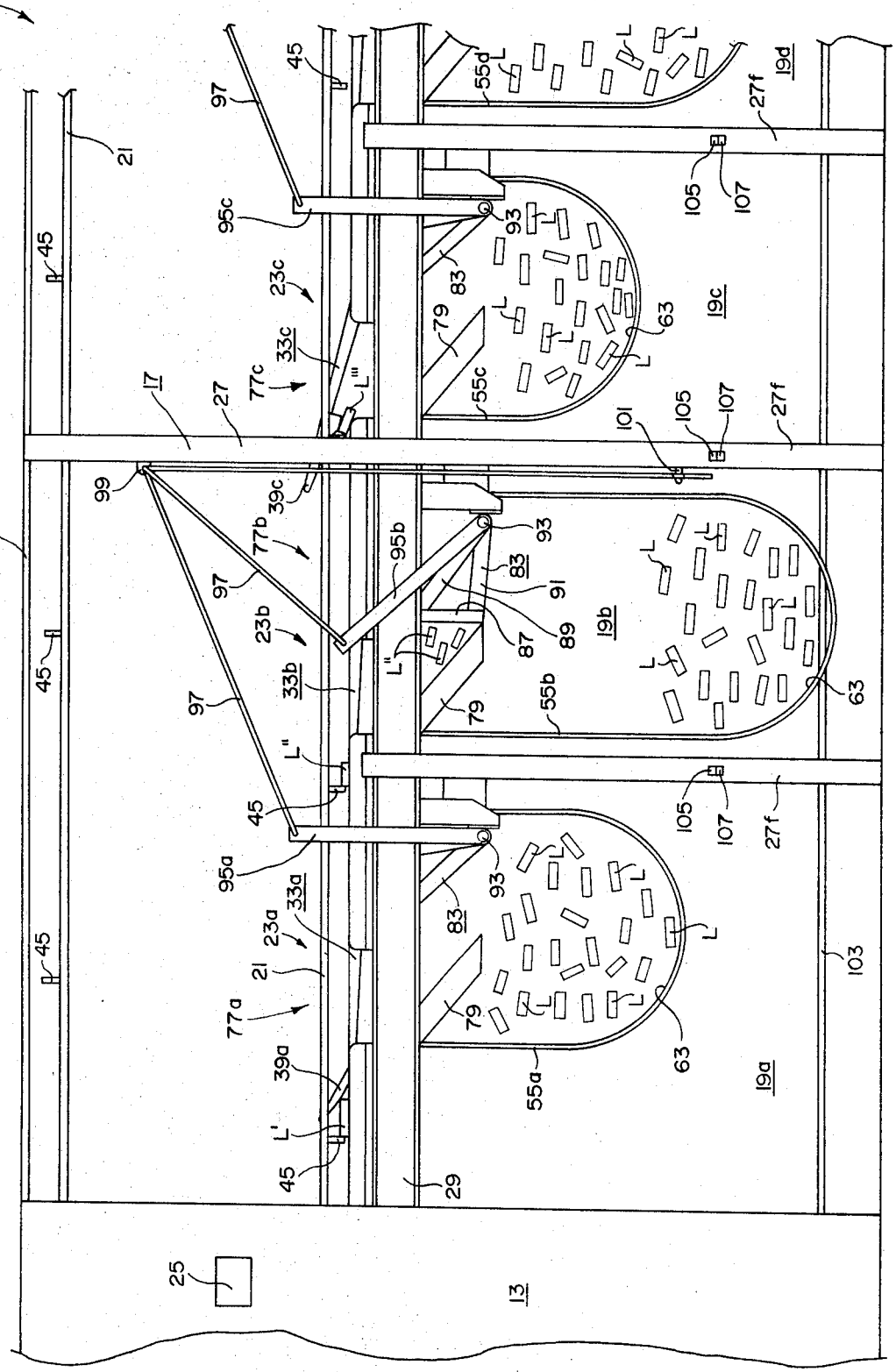
FIG. 1 is a partial front elevational view of the lumber sorter of the present invention, showing a few of the plurality of bays each having the let-down cradles of the present invention incorporated therewith.

The lumber sorter 11 of the present invention includes the usual house-like structure 13 having one end thereof opening outwardly into shed-like structure 15 which includes the usual frame structure 17. The frame structure 17 defines a plurality of bays 19 or sorting and stacking stations which for purposes of clarity have been designated as 19a for the first bay, 19b for the second bay, etc. Lumber sorters per se of the type referenced herein are shown in U.S. Pat. No. 3,279,600, issued Oct. 18, 1966, to J. M. Lawson and/or U. S. Pat.

No. 3,254,764, issued June 7, 1966, to J. S. Boyle and drag chain lumber sorters well known to those skilled in the art. Therefore, a brief description of lumber sorters per se will suffice for present purposes, reference should be made to the above-mentioned patents for a more detailed description of the character and structure of lumber sorters.

The lumber sorter 11 of the present invention includes means, such as a drag chain conveyor 21 and other ancillary structure (not shown), for systematically moving the lumber pieces depicted by the letter L of various dimensions over the bays 19. A plurality of arm means 23 also are included and respectively are disposed superjacent the bays 19 as clearly shown in FIG. 1 of the drawings. Also included are typical means, such as a memory system diagrammatically depicted in FIG. 1 of the drawings and character referenced therein by the numeral 25, for selecting certain lumber pieces L and sequentially actuating the arm means 23 in a manner yet to be disclosed whereby lumber pieces L are categorized and packaged in the bays 19 according to predetermined categories. For example, the bay 19a that is herein disclosed will be designated as receiving lumber pieces L having a 10 inch width, the bay 19b receiving lumber pieces L having an 8 inch width, the bay 19c receiving lumber pieces having a 6 inch width, and the bay 19d receiving lumber pieces having a 4 inch width, etc. It should be understood that the memory system 25 may be programmed to select and categorize lumber pieces having other similarities, for example, different lengths and/or thicknesses, etc.

Figure 2:
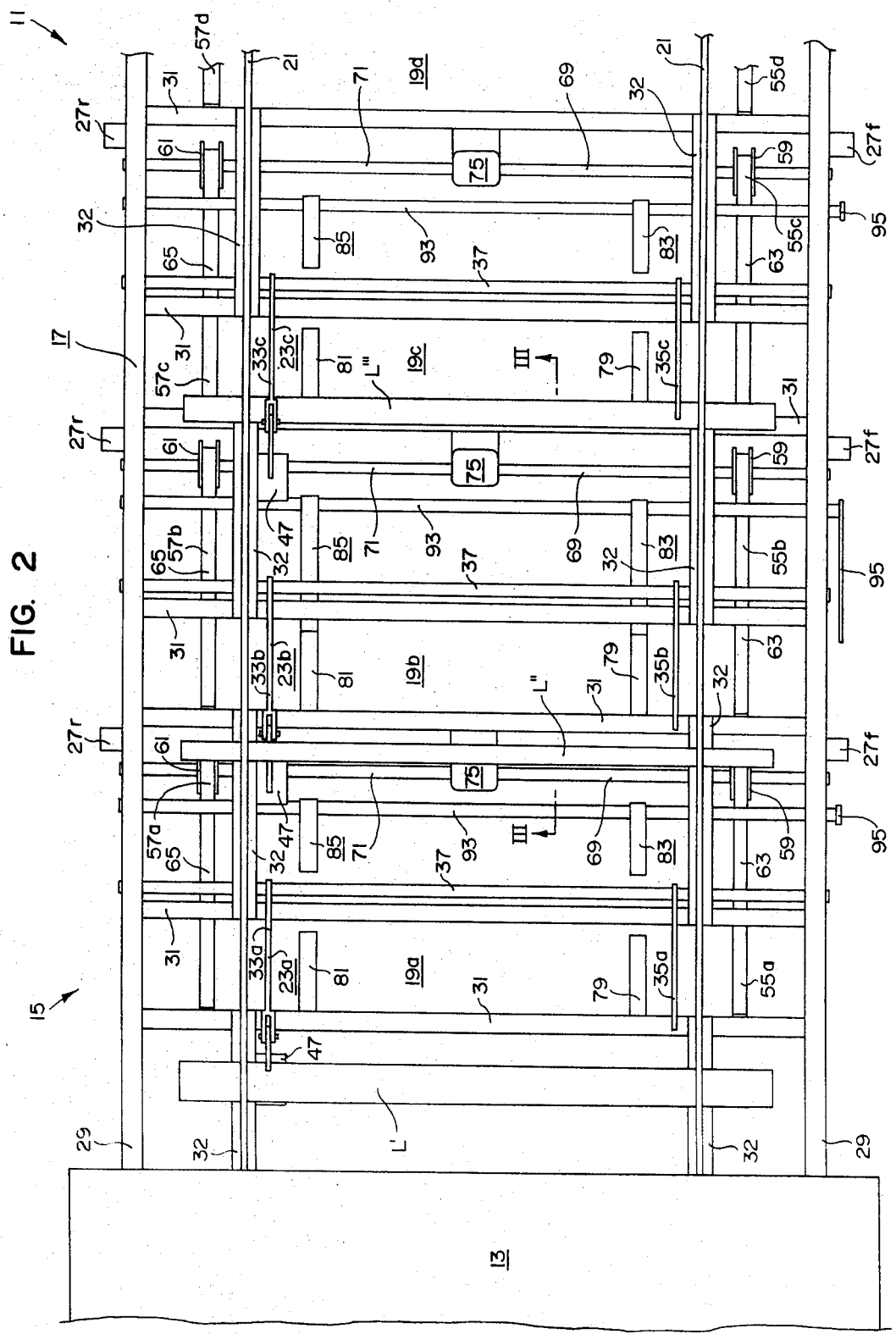
FIG. 2 is a top view of the structure depicted in FIG. 1 of the drawings.

From FIGS. 1 and 2 of the drawings, it may be seen that the frame structure 17 includes a plurality of vertical support members 27, at least a pair of horizontally disposed main support members 29, and a plurality of horizontally disposed auxiliary support members 31. Also included are a plurality of runners 32 which extend parallel with the I-beam support members 29 and are suitably spaced to slidably support lumber pieces L as they are dragged along by the conveyor 21, i. e., the arm means 23 slidably supports the lumber pieces L as they move directly above the bays 19 or carries the lumber pieces L from one set of runners 32 to the next succeeding set. It should be understood that the roof of the shed structure 15 has been removed in FIG. 2 in order to more clearly show the structure contained therein.

Each of the bays 19 has incorporated therewith one of the arm means 23 which includes a master arm member 33 and at least one slave arm member 35 as shown in FIG. 2 of the drawings. The master and slave arm members 33, 35 are fixedly attached to a lateral shaft member 37 whereby movement of the master arm member 33, in a manner yet to be disclosed, causes the slave arm member 35 to move in unison therewith. It should be understood that a pair of slave arm members 35 usually are suitably incorporated to straddle the centrally located master arm member 33 in a manner obvious to those skilled in the art. In other words, for simplicity purposes, only one slave arm member 35 is shown for each bay 19 rather than the usual two.

Figure 3:
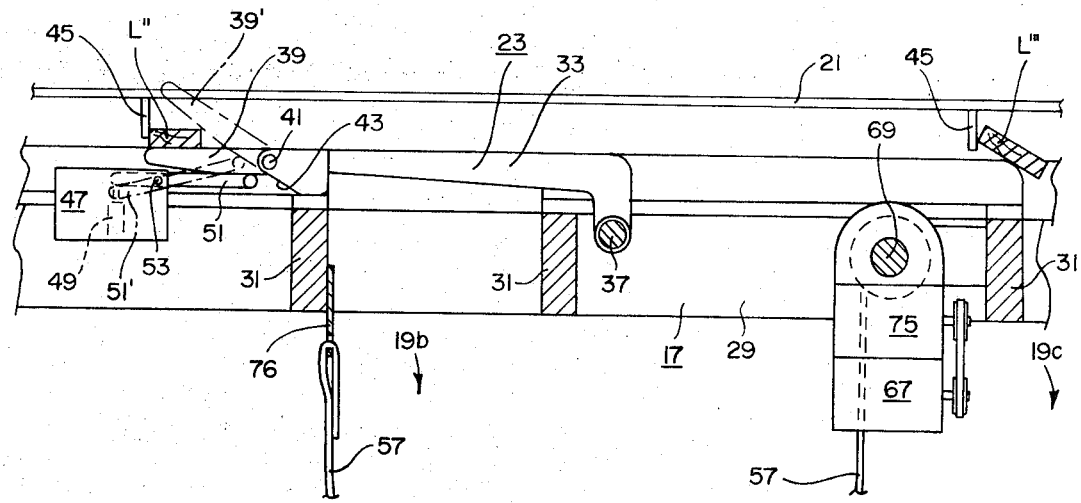
FIG. 3 is a sectional view taken as on the line III—III of FIG. 2.

Particular attention is now directed towards FIG. 3 of the drawings wherein it may be seen that each of the master arms 33 includes an articulating extremity 39 which is free to pivot within limits about a pivot pin 41. In other words, the extremity 39 is phantomized in a position depicting its maximum travel upwardly and character referenced by the numeral 39'. The master arm member 33 also includes a camming portion 43 adjacent the pivot pin 41 for reasons yet to be disclosed.

The conveyor 21 preferably has flat bars or lugs 45 which engage and drag the lumber pieces L along the runners 32 and/or arm means 23. The lumber sorter 11 also includes a plurality of solenoid assemblies 47 which are actuated by the memory system 25 in a manner obvious to those having ordinary skill in the art. For the purposes of the present invention, it should suffice to explain that the solenoid assemblies 47 include an electrically actuated plunger 49 which causes a lever 51 to pivot about a pivot point 53 as clearly shown in FIG. 3 of the drawings. In other words, the lever 51 may be rotated about the pivot pin 53 to the position phantomized by the numeral 51', thus moving the articulating extremity 39 to the position depicted by the numeral 39'.

From the foregoing, it should now be apparent that the arm means 23 respectively have first and second positions and placing the arm means 23 in the first position as shown in solid lines in FIG. 3 of the drawings is effective to reject lumber pieces L'', allowing them to pass on to the next succeeding bay 19. On the other hand, placing the arm means in the second position, i. e., actuating the solenoid assembly 47 as just described is effective to move the articulating extremity 39 upwardly as depicted by the numeral 39' which causes the approaching lumber piece L'' to engage the lower edge of the articulating extremity 39 and as the lug 45 drags the lumber L'' further along, the master arm member 33 and the shaft 37 are caused to rotate in a clockwise direction which carries the slave arm member 35b (FIG. 2) upwardly allowing the lumber piece L'' to be received in one of the bays, such as the bay 19b corresponding to the arm means 23b.

Figure 5:
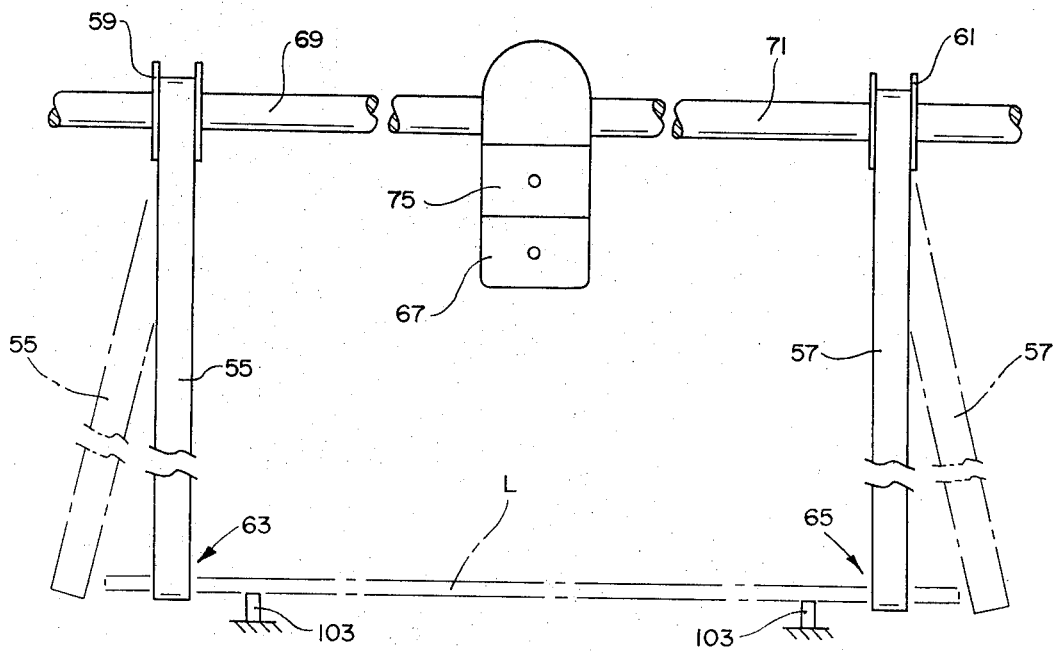
FIG. 5 is an enlarged side elevational view of the let-down cradles of the present invention showing a piece of lumber in phantom restingly supported by an infeed conveyor and the phantomized cradles freed from the lumber by being displaced beyond the respective ends of the lumber pieces.

In order to more clearly explain the remaining structure, it will be advantageous to further identify the frame structure 17. More specifically, the forward vertical support members 27 are character referenced by the numeral 27f and the rearward part of the frame structure 17 is identified by the vertical support members being character referenced by the numeral 27r. The lumber sorter 11 includes forward and rearward elongated flexible members 55, 57 for each of the bays, e. g., 55a, 57a; 55b, 57b; 55c, 57c, etc. FIG. 5 of the drawings more clearly shows the flexible members 55, 57 which preferably are formed from long webs of nylon strap or the like.

The sorter 11 also includes means, such as rotatable spool means 59, 61, movably suspending the respective forward and rearward elongated members 55, 57 transversely of the respective bays 19 to establish cooperating forward and rearward cradles 63, 65 for supporting lumber pieces L as clearly shown in FIGS. 1 and 5 of the drawings.

The sorter 11 also includes a prime mover, e. g., a 5 hp electric motor for each of the bays 19, to wind and unwind the elongated members 55, 57 about the respective spool means 59, 61 or to simultaneously raise and lower the forward and rearward cradles 63, 65. More specifically, the forward spool means 59 is fixedly attached concentrically thereof to a forward shaft 69 and the spool means 61 is fixedly attached concentrically thereof to a rearward shaft 71, as best shown in FIGS. 2 and 5 of the drawings.

Figure 4:
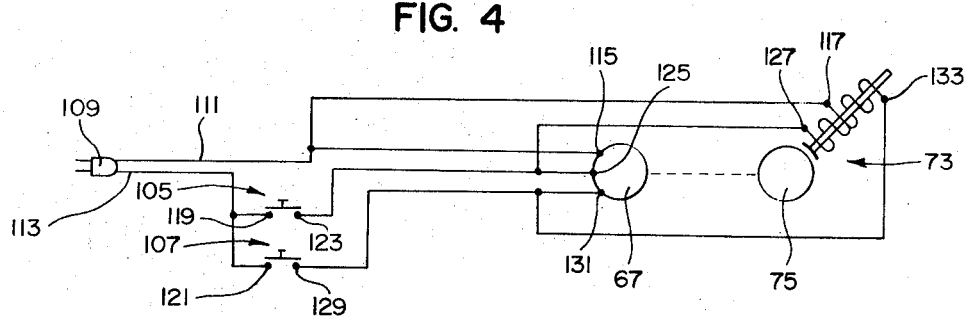
FIG. 4 schematically depicts the electrical structure incorporated with the let-down cradles of the present invention.

The lumber sorter 11 also includes releasable brake means 73 as shown in FIG. 4 of the drawings for selectively holding the forward and rearward cradles 63, 65 at various heights while supporting the weight of the lumber pieces L carried thereby. Additionally, gear reduction means 75 are included and are interposed between the motor 67 and the spool means 59, 61 for increasing the torque of the motor 67 in a manner obvious to those of ordinary skill in the art.

More specifically, the inner ends of the shafts 69, 71 are coupled to the gear reduction means 75 as shown in FIG. 5 of the drawings whereby rotation of the motor 67 causes simultaneous rotation of the forward and rearward spools 59, 61.

One of the ends of the flexible members 55, 57, like that shown for the member 57 in FIG. 3, is attached to the respective spool 59, 61 and the opposite ends of the elongated members 55, 57 are suitably attached to the support member 31, as by a bracket 76.

However, it should be understood that both ends of the elongated members 55, 57 may be attached to take up means such as the spool means 59, 61 in a manner obvious to those of ordinary skill in the art without departing from the spirit and scope of the present invention.

The sorter 11 also includes a plurality of gate means 77 which are individually designated as 77a, 77b, and 77c, etc., interposed respectively between the corresponding arm means 23 and the bays 19 as best viewed in FIG. 1 of the drawings. The gate means 77a and 77c are shown in an open position and the gate means 77b is shown in a closed position. Placing any one of the gate means 77 in the open position allows the lumber pieces L to pass through the gate and be received in the coresponding cradles 63, 65. Placing the gate means 77 in the closed position is effective to allow the lumber pieces L to be supported by the gate means 77 a distance above the cradles 63, 65. Additionally, placing the gate means 77 in the open position subsequent to lumber pieces L being supported by the gate means 77 is effective to release the supported lumber pieces L, i. e., allowing the lumber pieces L to be received by the cradles 63, 65.

More specifically, each of the gate means 77 includes a pair of stationary threshold members 79, 81 and a pair of movable barricade members 83, 85. The stationary members 79, 81 are positioned substantially as depicted in FIG. 1 of the drawings and the upper ends thereof are fixedly attached to the adjacent support member 31 in a well known manner, as by welding or the like. The barricade members 83, 85, being substantially identical one with the other, each include a bumper member 87 supported in a position substantially as depicted in FIG. 1 by a pair of support members 89, 91 which are fixedly attached one to the other as by welding or the like. The support members 89, 91 are fixedly attached, as by welding or the like, to a shaft 93 which extends a distance equal to the spaced apart distance of the longitudinal support members 29 as shown in FIG. 2 of the drawings. A lever 95 is fixedly attached adjacent the forward end of the shaft 93 for imparting rotational movement to the shaft 93 for the purpose of opening and closing the gate 77. More specifically, placing the lever 95 in a vertical position, like that shown for the lever 95c, is effective to open the gate 77 and placing the lever in a diagonal position, like that shown for the lever 95b, is effective to move the barricade members 83, 85 to a position adjacent the respective threshold members 79, 81 whereby lumber pieces L engage the bumper members 87 as clearly shown for the gate means 77b, i. e., the lumber pieces are supported by the threshold members 79, 81 and the bumper members 87. One end of a lanyard 97 is attached to the outer end of each of the levers 95 and extends upwardly through a sheave 99, thence downwardly to a cleat 101 for receiving wrappings of the opposite end of the lanyard 97. In this manner, the lever 95 may be remotely operated between the open and closed positions for reasons yet to be disclosed.

The sorter 11 also includes infeed conveyor means 103 for selectively receiving the packaged lumber pieces from the respective plurality of cradles 55, 57 and conveying the lumber pieces L to a location remote from the bays 19, e. g., to a lumber stacker or the like (not shown). In other words, subsequent to a bay receiving the package of lumber pieces L the elongated members 55, 57 supporting the lumber pieces are slackened by operating the motor 67, thus lowering the package until it restingly engages the infeed conveyor 101, as shown in FIG. 5 of the drawings. In this manner, the cradles 63, 65 may freely be slipped beyond the respective ends of the package of lumber pieces L, as shown by the phantomized members 55', 57' in FIG. 5 of the drawings. The cradles 63, 65 are then raised to a position adjacent the corresponding gate 77. It should be understood that the infeed conveyor 103 may be deleted from the sorter 11 without departing from the spirit and scope of the present invention. In this event, the package of lumber pieces L would be lowered until it restingly engages the typical buggy (not shown).

It should now be apparent that the purpose for the gate means 77 is to allow the drag chain conveyor 21 to continue operating while the package of lumber is being removed from the cradles 63, 65. More specifically, when it has been determined that a bay, e. g., the bay 19b, has received a package of lumber pieces L, a workman releases the lanyard 97 from the cleat 101, thus allowing the movable barricade members 83, 85 to gravitate to a position adjacent the respective threshold members 79, 81. This also moves the lever 95 to the previously described diagonal position. Accordingly, while the cradles 63, 65 are being freed from the package of lumber pieces L, in the manner just described, the lumber pieces L'' are received within the gate means 77 in the above-described manner. Subsequent to raising the cradles 63, 65 to the position adjacent the respective gate 77, the workman pulls the lanyard 97 so that the lever 95 moves to the vertical position which opens the gate, thus allowing those captured lumber pieces L'' to fall into the cradles 63, 65.

It should be pointed out that the workman constantly monitors the several bays and frequently actuates structure yet to be disclosed to selectively lower the individual pairs of cooperating cradles 63, 65 a short distance as the lumber pieces L accumulate therein. In other words, he must be constantly alert to insure that the lumber pieces L never fall too far or never build up too high in the cradles 63, 65 as the sorter 11 operates.

The sorter 11 includes control means, e. g., like the switches 105, 107 shown in FIG. 4 of the drawings, for remotely operating each of the motors 67. The switches 105, 107 preferably are suitably attached to the vertical support members 27f as shown in FIG. 1 of the drawings. From FIG. 4 of the drawings, it may be seen that closing the switch 105 causes the motor 67 to operate in a forward direction and simultaneously releases or energizes the brake means 73. On the other hand, holding the switch 107 closed and relasing the switch 105 causes the motor 67 to rotate in a reverse direction and simultaneously releases or energizes the brake means 73.

More specifically, the motor 67 is suitably coupled to a power source, e. g., a male plug 109 having a pair of conductors 111, 113 attached thereto is received in any convenient voltage outlet socket. The conductor 111 is coupled to a common terminal 115 of the motor 67 and a common terminal 117 of the brake means 73. The conductor 113 is coupled to a terminal 119 and a terminal 121 of the respective switches 105, 107. A terminal 123 of the switch 105 is coupled to the forward terminal 125 of the motor 67 and to the terminal 127 of the brake means 73. A terminal 129 of the switch 107 is coupled to the reverse terminal 131 of the motor 67 and the terminal 133 of the brake means 73.

Although the invention has been described and illustrated with respect to a preferred embodiment thereof, it is to be understood that it is not to be so limited since changes and modifications may be made therein which are within the full intended scope of the invention.

I claim:

1. An improvement in a lumber sorter having a plurality of bays for receiving pieces of lumber, means for systematically moving lumber pieces of various dimensions over said bays, and means for selecting certain lumber pieces and causing them to be received in one of said bays whereby lumber pieces may be categorized by being dropped into said bays according to predetermined categories, said improvement comprising forward and rearward continuous elongated flexible members respectively for said bays to provide one of said forward members and one of said rearward members for each of said bays, means movably suspending said forward elongated members transversely of said respective bays to establish forward cradles, means movably suspending said rearward elongated members transversely of said respective bays to establish rearward cradles for cooperating with said forward cradles to support the lumber pieces dropped therein, said forward and rearward cradles of each of said bays normally having a substantially parallel spaced apart disposition with the distance therebetween being less than the length of the lumber pieces, said forward cradles being free to swing independently from said cooperative rearward cradles, said rearward cradles being free to swing independently from said cooperative forward cradles, and means for selectively controlling the height of said rearward and forward cradles.

2. The improvement of claim 1 in which is included infeed conveyor means for selectively receiving the packaged lumber pieces from said respective plurality of forward and rearward cradles and conveying the lumber pieces to a location remote from said plurality of bays.

3. The improvement of claim 1 in which is included a plurality of gate means positioned respectively adjacent said plurality of bays, said gate means having open and closed positions, placing said gate means in said open position being effective to allow the lumber pieces to pass through said gate and be received by said cradles, placing said gate means in said closed position being effective to allow the lumber pieces to be supported by said gate means a distance above said cradles, and placing said gate means in said open position subsequent to lumber pieces being supported by said gate means being effective to release the supported lumber pieces.

4. The improvement of claim 1 in which said means for movably suspending said forward and rearward cradles includes rotatable spool means, said forward and rearward elongated members being attached to said spool means.

5. The improvement of claim 4 in which said means for controlling the height of said forward and rearward cradles includes means attached to said spool means for winding and unwinding said elongated members about said spool means to simultaneously raise and lower said forward and rearward cradles.

6. The improvement of claim 5 in which said means for controlling the height of said forward and rearward cradles additionally includes releasable brake means for selectively holding said forward and rearward cradles at various heights while supporting the weight of the lumber pieces carried thereby.

7. The improvement of claim 6 in which said means for winding and unwinding said elongated members about said spool means includes a prime mover coupled to said spool means for rotatably driving said spool means.

8. The improvement of claim 7 in which said means for controlling the height of said forward and rearward cradles further includes gear reduction means interposed between said prime mover and said spool means for increasing the torque of said prime mover.

9. The improvement of claim 1 in which said forward and rearward elongated flexible members consist of webs of nylon.

10. An improvement in a lumber sorter having frame means establishing a plurality of bays for receiving pieces of lumber, means for systematically moving lumber pieces of various dimensions over said bays, and means for selecting certain lumber pieces and causing them to be received in one of said bays whereby lumber pieces may be categorized by being dropped into said bays according to predetermined categories, said improvement comprising a forward and a rearward continuous elongated flexible member for each of said bays, one of the respective ends of said forward and rearward flexible members being fixedly attached to said frame means, a plurality of independently driven rotatable spool means respectively disposed adjacent said plurality of bays for selectively taking in and paying out said forward and rearward flexible members, the other one of the respective ends remote from said one end of said forward and rearward flexible members being attached to said plurality of spool means with said forward and rearward flexible members extending transversely of said respective bays at a predetermined spaced apart distance which is less than the length of the lumber pieces to establish forward and rearward cradles for cooperatively supporting the lumber pieces dropped therein, each of said forward cradles being free to swing independently from said cooperative rearward cradle, each of said rearward cradles being free to swing independently from said cooperative forward cradle, and said cooperative forward and rearward cradles of said plurality of bays respectively being selectively raised and lowered indiscriminately by said plurality of spool means.

* * * * *